(12) United States Patent
Catrein et al.

(10) Patent No.: US 10,705,740 B2
(45) Date of Patent: Jul. 7, 2020

(54) MANAGING OF STORAGE RESOURCES

(71) Applicant: Telefonaktiebolaget LM Ericsson (publ), Stockholm (SE)

(72) Inventors: Daniel Catrein, Würselen (DE); Manuel Buil, Barbastro (ES); Tobias Engelbert, Wuerselen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/572,208

(22) PCT Filed: May 8, 2015

(86) PCT No.: PCT/EP2015/060218
§ 371 (c)(1),
(2) Date: Nov. 7, 2017

(87) PCT Pub. No.: WO2016/180440
PCT Pub. Date: Nov. 17, 2016

(65) Prior Publication Data
US 2018/0150246 A1 May 31, 2018

(51) Int. Cl.
*G06F 3/06* (2006.01)
*G06F 9/50* (2006.01)
(Continued)

(52) U.S. Cl.
CPC .......... *G06F 3/0619* (2013.01); *G06F 3/0605* (2013.01); *G06F 3/067* (2013.01); *G06F 3/0665* (2013.01); *G06F 3/0689* (2013.01); *G06F 9/45558* (2013.01); *G06F 9/46* (2013.01); *G06F 9/4881* (2013.01); *G06F 9/5016* (2013.01); *G06F 2009/45583* (2013.01)

(58) Field of Classification Search
CPC .... G06F 3/0605; G06F 3/0619; G06F 3/0665; G06F 3/067; G06F 3/0689; G06F 9/45558; G06F 9/46; G06F 9/4881; G06F 9/5016; G06F 2009/45583
See application file for complete search history.

(56) References Cited

U.S. PATENT DOCUMENTS 6,249,802 B1  6/2001 Richardson et al.
8,429,276 B1  4/2013 Kumar et al.
(Continued)

*Primary Examiner* — Aracelis Ruiz
(74) *Attorney, Agent, or Firm* — Patent Portfolio Builders, PLLC

(57) ABSTRACT

In general, it is proposed to define techniques for managing a virtual storage volume in a cloud architecture comprising hosts which provide storage volume. The managing is achieved by checking the available virtual storage volume when a storage service request from a request interface is received. The virtual storage volume comprises at least one storage volume being assigned to the virtual storage volume. In case the storage service request can not be fulfilled by the available virtual storage volume, a request to the request interface is sent for requesting additional storage volume directly from at least one host. Upon receipt of an accept message that a storage volume fulfilling the storage service is exiting and available, the request interface initiates assigning of the additional storage volume to the virtual storage volume. As next the storage service request is executed on the virtual storage volume.

22 Claims, 10 Drawing Sheets

(51) Int. Cl.
*G06F 9/46* (2006.01)
*G06F 9/455* (2018.01)
*G06F 9/48* (2006.01)

(56) References Cited

U.S. PATENT DOCUMENTS

| | | | |
|---|---|---|---|
| 2012/0042139 A1* | 2/2012 | Coronado | G06F 11/2074 711/162 |
| 2013/0031341 A1 | 1/2013 | Ganti et al. | |
| 2015/0052518 A1 | 2/2015 | Sarisky et al. | |
| 2015/0178019 A1* | 6/2015 | Hegdal | G06F 3/0664 711/170 |

* cited by examiner

MANAGING OF STORAGE RESOURCES

TECHNICAL FIELD

The present disclosure relates to techniques for managing virtual storage, in particular techniques for providing storage resources in cloud architecture. The technique can be implemented as a method, a software solution, a hardware solution, or a combination thereof.

The present disclosure may be practiced within network solutions using virtualized storage resources for performing operations.

BACKGROUND

By cloud computing reference is made to a type of computing which abstracts from physical compute, network, and storage resources and provides shared access to virtual compute, network and storage resources. The components thereof are in a network solution connected by means of a network.

Virtualization provides abstracted access to compute resources (CPU, main memory), networking, and storage. In the following, with virtual machine (VM) reference is made to virtual compute or storage or network resources. Creating a virtual machine refers to deploying or allocating the compute resource, to which storage and networking resources can be added (or associated or connected). Usually a VM is attached to at least one host providing the compute or storage resources.

One common deployment offers a solution in which each host with storage capacity (or storage backend) provides that storage to any virtual machine in the cloud architecture. However, each host is independent of the rest. Inside cloud architecture, the concept of clustering of resources is widely used in order to increase the resiliency of services, improve the efficiency in usage of resources and protect applications running on it from hardware failure.

To orchestrate and manage the cloud architecture, OpenStack can be used. OpenStack is a cloud operating system or architecture that controls large pools of compute, storage, and networking resources. It comprises multiple components which manage specific system components or system areas. In particular, the component Cinder of OpenStack is responsible for managing the storage resources. The Cinder component comprises several subcomponents including Cinder-API, Cinder-scheduler, Cinder-volume.

Cinder-Api is in general responsible for receiving and handling requests and placing them in a message queue. Cinder-scheduler determines and assigns storage volume to which provisioning requests will be sent. Cinder-volume runs on the storage node or host and manages the storage space. Cinder-volume service can run on multiple nodes, each constituting part of the storage pool. Further the storage backend of the hosts may be clustered to build a logical storage volume and the Cinder-volume controls the logical storage. The Cinder-scheduler service is responsible for distributing requests across all nodes that are running the volume service.

Summarizing, Cinder component virtualizes pools of storage devices or storage backend and provides end users with a self-service in form of Cinder API in order to request and consume those resources without requiring any knowledge of where their storage is actually deployed or on what type of device.

FIG. 1 shows an example of a cloud infrastructure based on the Cinder architecture. The cloud infrastructure or architecture according to FIG. 1 comprises Cinder-API 101, Cinder-scheduler 102, and two exemplary Cinder-volumes 103, 104. Cinder-API, 101, is adapted to receive requests, Request, from tenants to manage (create, delete, resize, backup, . . . ) storage volumes and to forward them to the Cinder-scheduler, 102. The Cinder-scheduler 102 distributes this request to one of the available storage backends, 105, 106 and decides which of the storage backends 105, 106 serves the request. Each of the storage backends 105, 106 is controlled by an attached Cinder-volume 103, 104. Cinder-API 101 and Cinder-scheduler 102 may be deployed in a controller node like a storage resource manager. Cinder-volume 103, 104, responsible for the management of the actual storage backends, are deployed on the host, 110, 111 hosting the storage backend, 105, 106. For the sake of simplification it is assumed, there are as many Cinder-volumes as storage backends placed in the cloud infrastructure. Storage volume is offered to virtual machine VM, 107 from storage backends, i.e., typically, storage backends provide storage volumes to tenant VMs.

A storage resource manager like a Cinder-scheduler controls the individual Cinder-volume and the attached storage backend and assigns each of the storage backend individually depending on which of the storage backend can fulfill the request. Thus, a storage resource manager is a service provided in cloud architecture. When a virtual machine is initially deployed, the storage resource manager of the cloud environment is responsible to find the best matching storage volume for that virtual machine. Often there will be several storage volumes to choose from and the storage resource manager has the task to decide which storage is to be provided. The decision may be influenced by load balancing strategies, capacity needed by the virtual machine, storage profile of the storage volume.

The storage backend of the hosts may be clustered to build a logical storage volume and the Cinder-volume controls the logical storage. That means that in advance a virtual machine may be deployed and a storage backend may be assigned to that virtual machine. For example a virtual machine aggregating storage backend of a number of hosts (like for example of 5 hosts wherein each of the host have 1 TB, so that that VM may offer 5 TB) may be provided. This virtual machine has also a Cinder volume so that for the Cinder scheduler it is seen as a host with a certain storage volume (in this example of 5 TB). Consequently a Cinder-scheduler administrates the storage backends of the hosts and has access to the Cinder-volumes without knowing whether it is a physical host or logical storage since the virtual machine is deployed statically and in advance.

However this behavior of Cinder-volume is static. Cinder-volume is adapted to distribute existing storage capabilities of the "own" storage backends to clients. However, it is not possible in the present system to process requests if the storage volume of none of the individual storage backends can fulfill the request, thus if the service request requiring storage volume exceeds the storage volume of the individual hosts, including a storage volume of eventually deployed virtual machines. The consequence is that the request for performing a storage request will fail.

SUMMARY

There is a demand for a technique for managing virtual storage, in particular technique for flexible and efficient provision of storage resources in cloud architecture.

The invention is embodied in independent claims. Advantageous embodiments are described in the dependent claims.

The demand is satisfied with a method for managing a virtual storage volume in cloud architecture with at least one host providing storage volume. In the first step a virtual storage volume is checked whether the virtual storage volume can execute a storage service request wherein the storage service request is initiated by a request interface. Further the method comprises causing the request interface to request additional storage volume directly from the at least one host if the storage service request can not be fulfilled by the virtual storage volume. In the next step assigning of the additional storage volume to the virtual storage volume is caused.

Further the demand is satisfied with a method for managing a virtual storage volume in cloud architecture with at least one host providing storage volume being assigned to a request interface entity. In a first step a storage service request for checking a virtual storage volume for execution of the storage service request is triggered. In a next step it is proposed to cause to request additional storage volume if the outcome of the checking is that the storage service request can not be fulfilled by the virtual storage volume. Further the method comprises causing assigning the additional storage volume to the virtual storage volume.

Further the demand is satisfied with a control entity adapted to manage a virtual storage volume in cloud architecture. The cloud architecture comprises at least one host providing storage volume. The control entity comprises a checking unit for checking a virtual storage volume wherein at least one storage volume is assigned to the virtual storage volume. The checking step is caused by a storage service request initiated by a request interface. Further the control entity comprises a sending unit adapted to cause a request interface to request additional storage volume directly from the at least one host. The request is caused when the storage service request can not be executed by the available virtual storage volume. Further the control entity comprises an assignment unit for assigning the additional storage volume to the virtual storage volume. The assigning is initiated by the request interface when an answer from a host is received.

Further the demand is satisfied with a request interface entity adapted to manage a virtual storage volume in cloud architecture. The cloud architecture comprises at least one host providing storage volume. The request interface entity comprises a triggering unit for triggering a checking of a virtual storage volume to execute the storage service request. Further it comprises a processor for causing requesting additional storage volume directly from the at least one host, if the outcome of the checking is that the storage service request can not be fulfilled by the virtual storage volume. Further the request interface entity comprises an assigning unit for causing assigning the additional storage volume to the virtual storage volume.

Further the demand is satisfied with a system comprising a control entity which is adapted to communicate with a request interface. The request interface is able to receive request from the control entity to cause a requesting of additional storage volume and to communicate with the at least one host in order to request said additional storage volume.

Further the demand is satisfied with a computer program product comprising program code portions for performing the steps as described according to the embodiments when the computer program product is executed on a computing device.

The proposed solution provides a flexible and efficient provision of storage resources to the clients. In case a storage service request requests a certain storage volume, the solution is not restricted to the storage volume of individual hosts but it can offer an aggregated storage backend across the hosts flexible and on demand.

Furthermore the proposed solution provides a transparent improvement of the current architecture. Thus, the solution allows using the existing code of the cloud architecture without any significant changes in the system.

BRIEF DESCRIPTION OF THE DRAWINGS

In the following, the invention will further be described with reference to exemplary embodiments illustrated in the figures, in which.

DETAILED DESCRIPTION

Figure 1:
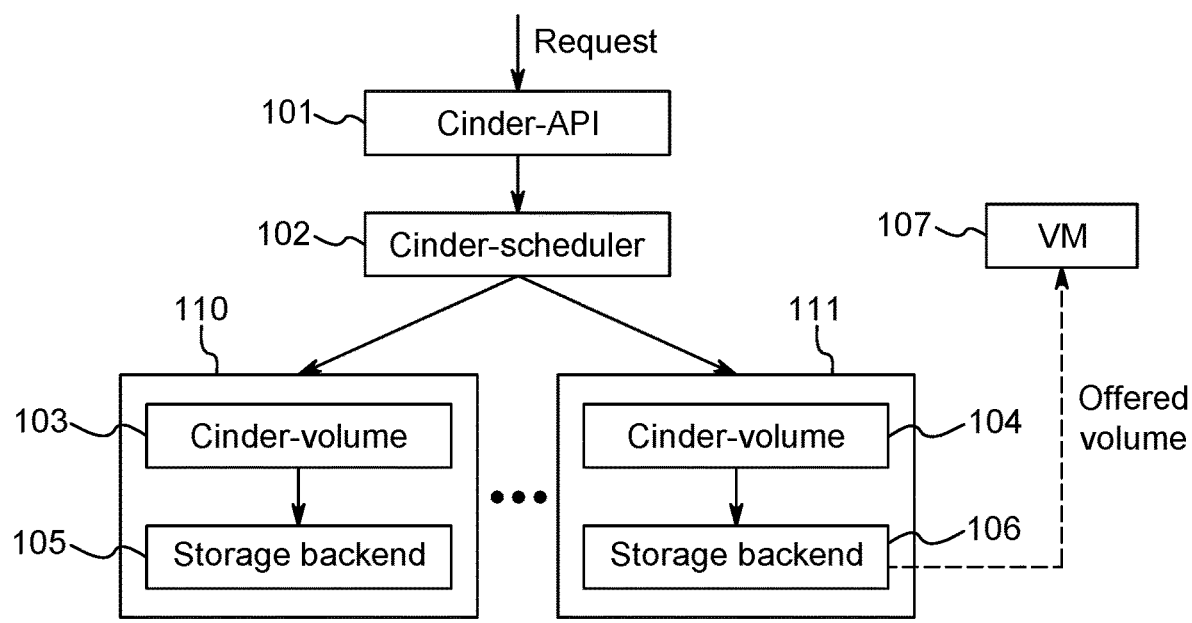
FIG. 1 shows an embodiment of Cinder architecture according to state of the art.

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled artisan will appreciate that the current invention may be practised with any network like for example UMTS, GSM or LTE networks. As another example, the invention may also be implemented in short-range wireless networks such as WLAN or Bluetooth systems or in wireline networks, for example in any IP-based networks.

Cloud computing refers to a model for enabling ubiquitous, convenient, on-demand network access to a shared pool of configurable resources, including any or a combination of servers, networks, storage, applications, services, that can be provisioned and released with minimal efforts.

As used herein, an entity may be implemented as a device or as a software or combination thereof. In particular it may be implemented as software being run directly or remotely on any appropriate hardware of a computing device as described further. In particular the entity as used herein may be adapted to perform the described techniques or functional steps directly or they may be adapted to initiate or cause the realization of all or some of the steps on other entities or network nodes. In one embodiment it is proposed to realize the entity as a virtual machine.

In the following, the term virtual machine VM is used to describe virtual compute resources. Creating a virtual machine refers to deploying or allocating the compute resource(s), to which storage and networking resources can be added (or associated or connected) on demand. Different technologies exist to allocate the compute resources and expose them to the virtual machines. Depending on the used technology, different term is used for the general terminology of virtual machine, for example in case of a hypervisor as hardware abstraction layer, the term virtual machine is used, when using Linux, the term container is used, also when talking about Platform as a Service, the term container is used. Hence, the term virtual machine should not be seen as any restriction to any specific technology. In general the term virtual machine reference to any kind of object/entity holding an instance of an application component.

In the following the term client is used as a user of a storage service. In particular, the client is adapted to generate requests being indicative of using storage volume. Usually the client provides the requests into the system using request interface. The term tenant is used in the present description as synonym for client. Further a virtual machine VM may be a tenant requesting for consuming storage volume. The term virtual storage volume is used in the sense of clustering the individual storage backend on the level of a control node. Logical storage or stacked storage are terms used as alternatively for virtual storage volume. The virtual storage volume may comprise pool of storage backend with the corresponding characteristics parameters like the storage volume, affinity/antiaffinity rules, connection parameters (e.g. address of the storage volume). The virtual storage volume is logical connected with the control entity in the sense that the control entity controls the virtual storage volume. Thus, it is proposed that the request interface contacts at first the control entity when asking for storage resources since the control entity administrates the virtual storage volume and the virtual storage volume is build up on demand and dynamically when it is requested.

In one embodiment, the virtual storage volume comprises a pool of storage backends wherein each of the storage backend may be managed by a storage volume manager. In this case when the assigned virtual storage volume can not fulfil the request, then the request interface is contacted in order to contact directly the storage volume manager since the storage volume manager administrates its storage backend. In one example, the storage volume manager is a Cinder-volume.

Storage backend will be used in the following as a synonym for the storage volume available at a host. As already mentioned the storage volume is described by parameters like for example volume, affinity/antiaffinity rules, connection parameters (e.g. address of the storage volume. The storage backend may be a physical storage or a logical storage administrated by a virtual machine connected to the host.

A request interface (or request interface entity) provides the possibility to enter service requests by a tenant for fulfilling a service. The request interface is adapted to receive request for managing and using storage volume. In an embodiment the request interface is an application interface, e.g. Cinder-API, being developed for entering storage service requests in order to realise a service by using storage volume. Further the request interface may comprise a scheduler being adapted to process the storage service requests by contacting the corresponding storage volume. Thus in a preferred embodiment the request interface comprises both functionalities, namely an application interface and a scheduler. Herein the scheduler is to be adapted to communicate with an application interface which causes the scheduler to request appropriate storage volume, either the virtual storage volume by contacting the control entity or the storage backend by contacting a host. Moreover the scheduler functionality may be used, namely the ability to contact a corresponding database having information about the storage and its usage at the hosts. The advantage is that the proposed technique may be easy implemented in a system including a scheduler, like for example in case of OpenStack with a Cinder-scheduler located between Cinder-API and the Cinder-Volumes.

In one embodiment, the at least one host hosts storage resource, in the sense that the storage is allocated or assigned to the at least one host. The host may be a computer or a computing device connected to a computer network or a virtual machine with assigned logical storage volume. The host may manage tasks, communicate or execute instructions, deliver specific services to other networked computers or computing devices. Most often, the computer acting as a host allows the other computing devices to access and run specific software applications on it.

Preferably a host comprises a storage volume manager adapted to manage the availability of the attached storage volume. In one embodiment using the Cinder component, a host comprises a Cinder-volume for this purpose. Thus, in this embodiment the term of contacting the host "directly" means by contacting the storage volume manager of said host. The storage may be either located directly at the host or may be allocated remotely and the host is connected to the node for example by any possibly and preferably network or it may be realised as a virtual machine administrating the storage volume distributed on other nodes.

Here, the action of causing refers to an entity or software element within an entity (e.g. control entity) that causes performing of a step like checking or sending a request to the request interface. The step may be either performed directly by the entity or software element of the entity or the performing of the step may be triggered by the entity or the software element within the entity so that the performing as such is realized either in the entity or remotely of the entity.

The following description is based on the Cinder component of the OpenStack architecture. However this should not be seen as any restriction. The techniques are not only applicable for managing block storage but also are applicable to other types of storage like for example shared file system service offered also by OpenStack, namely by the component called Manila.

Figure 2:
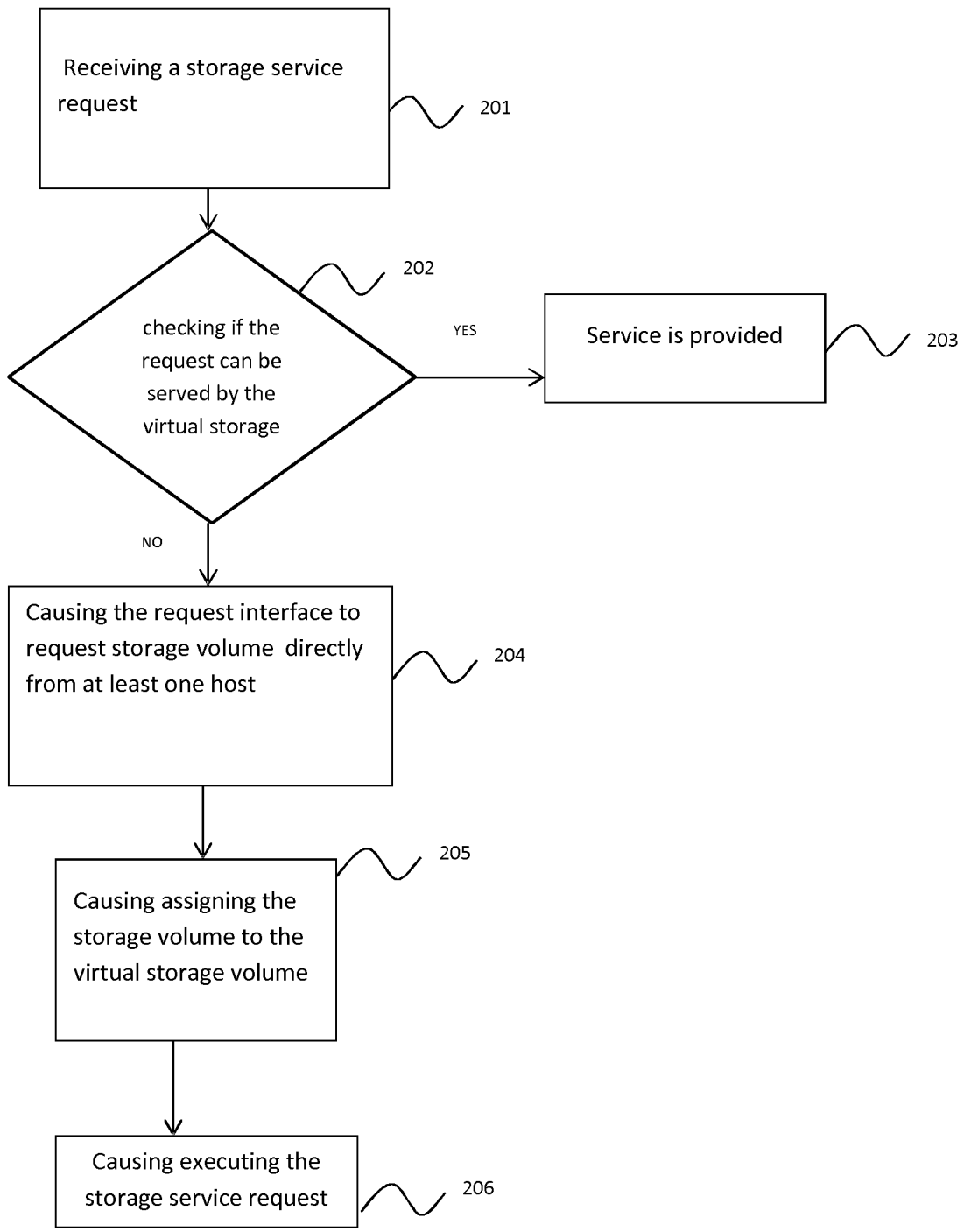
FIG. 2 shows a flowchart of a method in a control entity according to one embodiment.

In the following an embodiment of the invention is described in respect to FIG. 2 showing a flow diagram.

In a first step, 201, a storage service request is received. The generation of the storage service request is initiated by a tenant via the request interface. The reception of the request causes checking, 202, the available virtual storage volume for ability to execute the storage service request, thus the request interface triggers the checking procedure. The reception of the storage service request may not be necessary performed at the control entity. For example the storage service request may be received by a scheduler located between the application interface and the control unit, and said scheduler triggers the checking step of the control entity.

In one embodiment it is proposed that the checking step 202 comprises checking whether appropriate storage volume is already assigned to the virtual storage volume. The checking step may be performed using a database.

The database may be provided in any possible and preferably way. In one embodiment it is proposed to have an external database in the sense of not being a part of the control entity. Said database may be accessed in one embodiment directly by the control entity. Thus, the control entity communicates with said database in order to get information regarding the virtual storage volume assigned to the control entity. In a further embodiment it is proposed that the control entity provides its own internal database, in which the assigned virtual storage volume is administrated.

Consequently it is proposed that upon reception of a storage service request, it is checked by contacting an external or internal database, whether the available virtual storage volume can fulfil the request.

As already mentioned the checking step is not restricted to the volume of the virtual storage. In a further embodiment it is proposed to check affinity/anti-affinity rules of the storage volume.

Anti-affinity and affinity are rules specified by the user or by the cloud administrator that limits the scheduler options when taking decisions. This limitation is typically reasoned, for example, if a replication of storage is requested, it is desirable that the storage volume is hosted by a different host so that the crash of one host will only result in the crash of all also the replicated data. In this example, an anti-affinity rule may be added to the control entity, the rule stating that these two storage volume need always to be deployed in two different hosts. Based on FIG. 5, when checking of the available storage volume is triggered, it may be checked that any affinity or anti-affinity rule is not broken. This will prevent a storage volume to be replicated at the same host.

In one embodiment the storage service request may be a request for replication of a storage volume for example in order to prevent from data loss in case of storage space (disc) failure.

Further embodiment of the storage service request may be a request for providing file storage or object storage or block storage. The file storage is a file system provided as a service in the sense that the capacity and other characteristics, like for example access time are offered remotely. An example is Network File System NFS, allowing a user on a client computer to access files over a network much like local storage is accessed. Object storage provides also storage capacity however in form of objects which are similar to a file. The difference between object storage and file storage is that the object storage operates one layer higher then the file system. In other words the object storage makes use of the underlying file system and therefore allows scaling the storage capacity.

Further the storage service request may be a request for providing block storage in the sense of storage volume at the storage backend for performing service operations. In one example the block storage is an address for accessing a physical storage.

Further it is proposed that the control entity initiates a procedure for receiving updated information from the hosts regarding the current usage of the storage backend assigned to the virtual storage volume. This may be for example done by a direct interface or by eavesdropping information sent from the hosts. The triggering of a procedure for collecting information regarding the usage of the storage backend may be performed by a so-called daemon entity as described further. For this, the control unit causes to send requests to the hosts for providing information about the usage of storage volume hosted by the hosts.

Further the information regarding usage of the storage backend may be used by the control entity for example to decide to remove an assigned storage volume from the virtual storage volume if the assigned storage volume is not used. This would increase the flexibility of the system since resources would be shown directly as not used and may be provided to other service requests.

Coming back to FIG. 2, in case virtual storage volume is available for the storage service request, the service is provided 203, and for example if extending of a storage volume was requested, the VM to which the volume is to be attached to, will see a larger storage volume.

However in case virtual storage volume is not available for the storage service request, it is proposed to cause the request interface to request additional storage volume directly from the at least one host if the storage service request can not be fulfilled by the virtual storage volume, 204. In one embodiment it is proposed that the causing the request interface to request additional storage volume is realized by sending a request to the request interface for requesting storage volume directly from the at least one host.

In one embodiment it is proposed that causing the request interface to request additional storage volume comprises considering information collected from the hosts regarding storage backend as described in the following by collecting information from the hosts and by storing it appropriately.

However here, the action of causing refers to an entity or software element (e.g. a processor or software module instructing the sending) within the control entity that causes the sending. Alternatively it may also refer to an external element or device causing (e.g. in the sense of triggering) the sending by the control entity (e.g. a management device, a data center, a tenant, an administrator, instructing or initiating the sending).

Thus, the control entity causes requesting on demand (when needed) storage resources by causing the request interface to contact the hosts directly. This is done by contacting the request interface which then causes the contacting of the hosts, preferably the scheduler of the request interface contacts the storage volume manager at the hosts in order to find out whether the requested storage is available thereon.

In one embodiment it is proposed to determine requirements on the additional storage volume which is to be requested when the storage service request can not be fulfiled by the virtual storage volume. Thus the control entity may be adapted to determine which part of the storage service request, the control entity with its virtual storage could not fulfilled. For example the control may determine in case not enough storage volume is assigned, the storage volume which is to be requested. Further it may determine which affinity/ant-affinity rule could not be conformed. The result of the determination may be provided to the request interface as input for generating a request to the hosts, in particle when searching for a host fulfilling the not fulfilled requirement.

In another embodiment it is proposed that the step of causing the request interface to request additional storage comprises considering information regarding available storage backend.

In order to realize this feature it is required to keep track on the usage of storage volume. Thus it is proposed to collect information from the hosts regarding available storage backend. For this purpose it is proposed to contact a database being adapted to collect such information. In particular this may be the same database as described above and enhanced with the functionality of collecting information regarding available/used storage volume. Thus it is proposed to provide a database which is adapted to keep track on the storage backend in particular to keep track on the total, on the available and on the consumed storage volume. The database may be provided for a number of control entities. In particular it is advantageous to provide a central database for a number of control entities, then in this case the database has knowledge about the total storage volumes and about currently available storage volume at a higher number of hosts namely those controlled by the number of control entities.

In one embodiment it is foreseen that the storage volume managers located in the hosts communicates directly with the database in order to provide updated information on its storage backend. For example, a database as provided currently in the Cinder architecture may be accessed directly by the different Cinder-volumes in order to write the offered capacity and the capacity being currently used.

The advantage of considering the usage of storage resources when requesting additional storage volume is that by taking a decision regarding requesting additional storage volume, information is available whether there is potential storage backend fulfilling the required storage service request. In other words, the step of checking the available virtual storage volume for execution of a storage service request comprises considering the collected information when causing a request interface to request additional storage volume, for example by sending a request for additional storage to the request interface. Thus, in one embodiment it is proposed that when a control entity concludes that the available virtual storage is not sufficient, to perform some pre-establishment of the possibly available storage backend. The advantage is provision of a faster decision. Thus already at this stage, it may be decided by checking the storage availability in the database whether to cause the request interface to send a storage request to the hosts or not and if yes to which hosts.

In any case, independent whether a pre-establishment of the possible storage resources is performed either by the control entity or by the request interface upon receipt of a request for requesting additional storage volume, the task of the request interface is to contact the different storage backend for an appropriate storage, for example for a storage volume having enough free capacity in order to fulfil the request.

It may occur that the contacted host, even if a pre-establishment has been performed by checking the relevant information regarding the availability of the storage backend, can not provide the requested storage backend, for example because it has been requested in the meantime, in this case it is proposed that the request interface receives a reject message from the host and initiates to contact another host.

In case a request for additional storage volume was initiated to the request interface, the control entity waits for an answer or message from the request interface. The message may comprise references for accessing the additional storage volume. Upon reception of said message, the control entity causes assigning of the additional storage volume to the virtual storage volume, 205, wherein the storage volume is accessible by the provided connection information. Said information may also comprise further characteristics like for example affinity/anti-affinity rules or security aspects.

In one embodiment it is proposed that the causing of assigning the additional storage volume to the virtual storage volume comprises storing in database references of the storage volume in relation to the virtual storage volume. As already described the assignment may be either stored in an internal or in an external database depending on the implementation.

In one embodiment it is further proposed to announce the virtual storage volume to the request interface, so that when receiving a storage service request the virtual storage volume is known to the request interface as being available for fulfilling the request. The announcement may be also transparent to the request interface, namely when the virtual storage volume is stored or labelled in the same database as the storage of the other hosts. In this case the virtual storage is seen from the view of the request interface as a regular hosts. In other embodiment the virtual storage may be marked as a virtual storage volume which may be prioritised when requesting a storage service.

As next, in step 206, an execution of the storage service request is performed. The execution of the request is then performed on the virtual storage volume, which may be just generated on demand.

Figure 9:
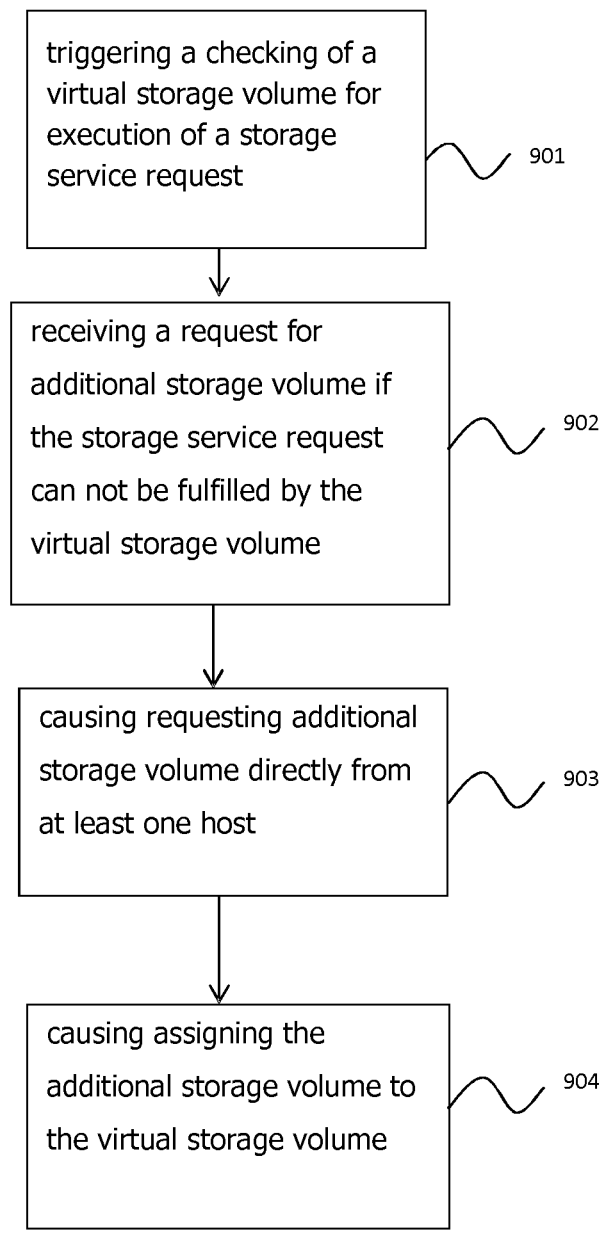
FIG. 9 shows a flowchart of a method in a request interface entity according to one embodiment.

In the following an embodiment of the invention is described in respect to FIG. 9 showing a flow diagram.

In a first step 901 a storage service request for checking a virtual storage volume for execution of the storage service request is triggered. Thus the request interface entity triggers a checking whether the virtual storage volume can fulfill the requirements of the storage service request. In the next step the request interface entity causes 904 requesting additional storage volume directly from the at least one host if the outcome of the checking is that the storage service request can not be fulfilled by the virtual storage volume. The causing may be initiated with a receipt of a request for additional storage volume if the storage service request can not be fulfilled by the virtual storage volume wherein the request is caused by the control entity. Upon receipt of an answer from the contacted hosts, the request interface entity causes assigning 904 the additional storage volume to the virtual storage volume.

Further the request interface entity is adapted to check with a database before contacting a host directly about status/availability/volume/affinity rules or any other parameters, like for example as further explained a virtual storage flag informing that a particular storage backend is already used by another control entity, for example another Cinder-on-Cinder driver. Thus the request interface entity is adapted to consider information collected from the hosts regarding storage backend.

Figure 3:
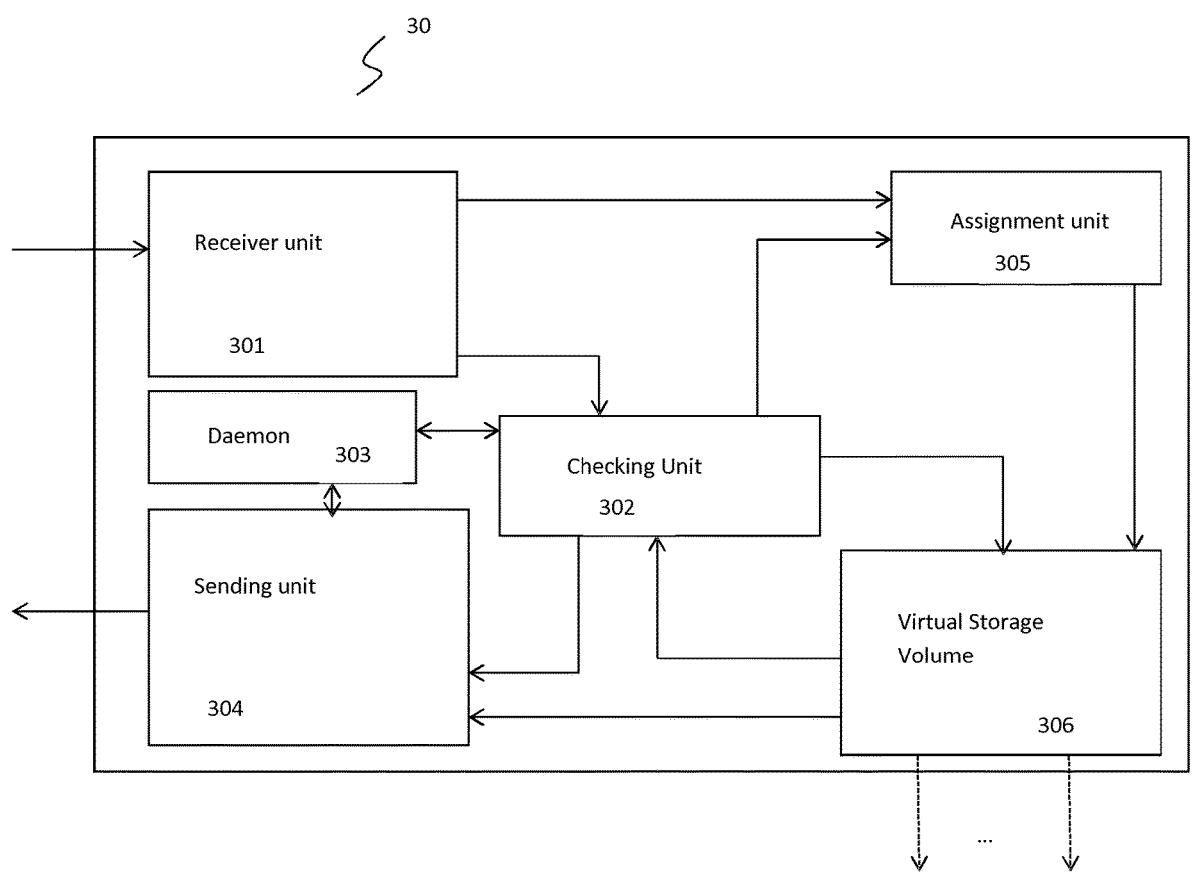
FIG. 3 shows schematically a control entity according to one embodiment.

In the following the control entity is described in respect to FIG. 3. According to FIG. 3 the control entity comprises a receiver unit 301 adapted to receiver messages. A message may be for example a storage service request from a request interface. Said message is processed by a checking unit 302. Said checking unit 302 checks the available virtual storage whether the available virtual storage can execute the storage service request.

In one embodiment it is proposed that the control entity which may be implemented as a device or as a software or combination thereof provides the functionality to manage and provide proper and on demand virtual storage volume for fulfilling the storage service request. In one embodiment this functionality is called Storage Driver on Driver and if connected to Cinder, then Cinder on Cinder Driver.

In a further embodiment it is proposed to provide a second entity, so called daemon 303. The second entity 303 is adapted to trigger collection of information required for managing the virtual storage volume by causing sending requests to the hosts for providing information about the storage volume hosted by the hosts. The collected information is advantageous by managing the virtual storage volume. In the following the term daemon is used for the second entity and if connected to Cinder, then Cinder-daemon. The second entity may be implemented as a device or as a software or combination thereof.

Thus, the daemon 303 is adapted to cause contacting the hosts. In one embodiment it is proposed that the daemon contacts the hosts directly, for example via the sending unit 304, for providing information regarding the usage of the storage backend at a particular host. In another embodiment, the daemon could also contact the scheduler (e.g. Cinder scheduler) through the application interface (e.g. cinder API) in order to cause the requesting of the available storage at the hosts (e.g. by contacting the Cinder-volume). In this embodiment it is further proposed that the daemon is adapted to eavesdrop messages received from the hosts, like for example from the Cinder-volumes, in order to filter out information about the storage volume hosted by the hosts. This information may be further provided to a database for updating information regarding the available storage backend.

The information regarding usage of the storage backend may be used by the control entity, for example by the checking unit 302, to decide to remove an assigned storage volume from the virtual storage volume if the assigned storage volume is not used. This would increase the flexibility of the system since resources would be shown directly as not used and may be provided to other service requests.

This information may be also used by the checking unit 302 when deciding on causing a request interface to request additional storage for example by sending a request via the sending unit 304 to the request interface in case the present storage is not able to fulfil the request (e.g. due to lack of volume or the characteristics of the storage does not match the request). The advantage is that when considering the information collected by the daemon 303, the checking unit 302 knows whether there is potential storage backend with the storage volume being able to fulfil the storage service request.

The checking unit 302, in case a decision is taken to order additional storage causes sending a request for requesting additional storage volume directly from at least one host. Upon reception of an answer from the request interface in form of a storage request, (according to FIG. 3 via the receiving unit 301, however this should not be seen as limitation), the assignment unit 305 causes assigning the additional storage volume to the virtual storage volume 306. When the requested storage volume is available, the storage service request is caused to be executed using the virtual storage volume 306. The dotted lines going from the virtual storage volume depicts connections to the hosts hosting the backend storage being the storage assigned to the virtual storage volume and wherein the hosts are computing devices at which the execution of the storage service request is finally fulfilled.

In one embodiment it is proposed that every unit can be implemented as a computer program or code running on a processor or as a module. The control unit may be also implemented as a computer program on the processor executing the functionality of the control unit 30.

The control entity may comprise also the second entity, the daemon. In other embodiment both entities are provided as separate entities and the control entity is further adapted to control both entities.

Figure 10:
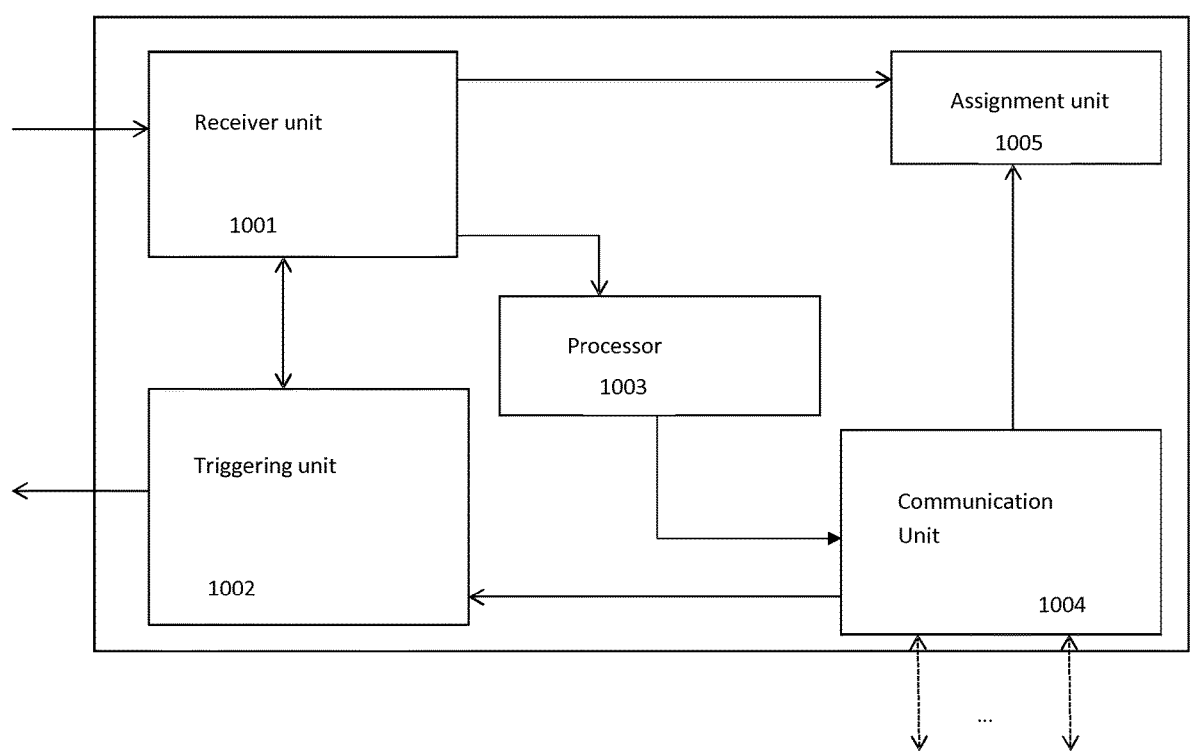
FIG. 10 shows schematically a request interface entity according to one embodiment.

In the following the request interface entity is described in respect to FIG. 10. According to FIG. 10 the request interface entity comprises a triggering unit 1002 adapted to trigger a checking of a virtual storage volume to execute the storage service request. Further the request interface entity comprises a processor 1003 for causing requesting additional storage volume directly from the at least one host, if the outcome of the checking is that the storage service request can not be fulfilled by the virtual storage volume.

In one embodiment it is proposed to contact a communication unit 1004 adapted to communicate with the hosts. In particular the entity is adapted to send a request for additional storage volume and for receiving message either indicating storage volume for assigning to the virtual storage volume or including a reject message.

Further the request interface may be adapted to contact at first a control entity for checking possibility to execute the storage service request. Furthermore the request interface entity may be adapted to contact a database for checking available storage volume.

Further the request interface entity comprises an assigning unit 1005 adapted to cause assigning the additional storage volume to the virtual storage volume. This may be performed either by informing the control entity about the available storage volume in order to assign the additional storage volume to the virtual storage volume or the request interface entity may send store the assigned storage volume in an appropriate database and to send a corresponding indication to the control entity.

Figure 4:
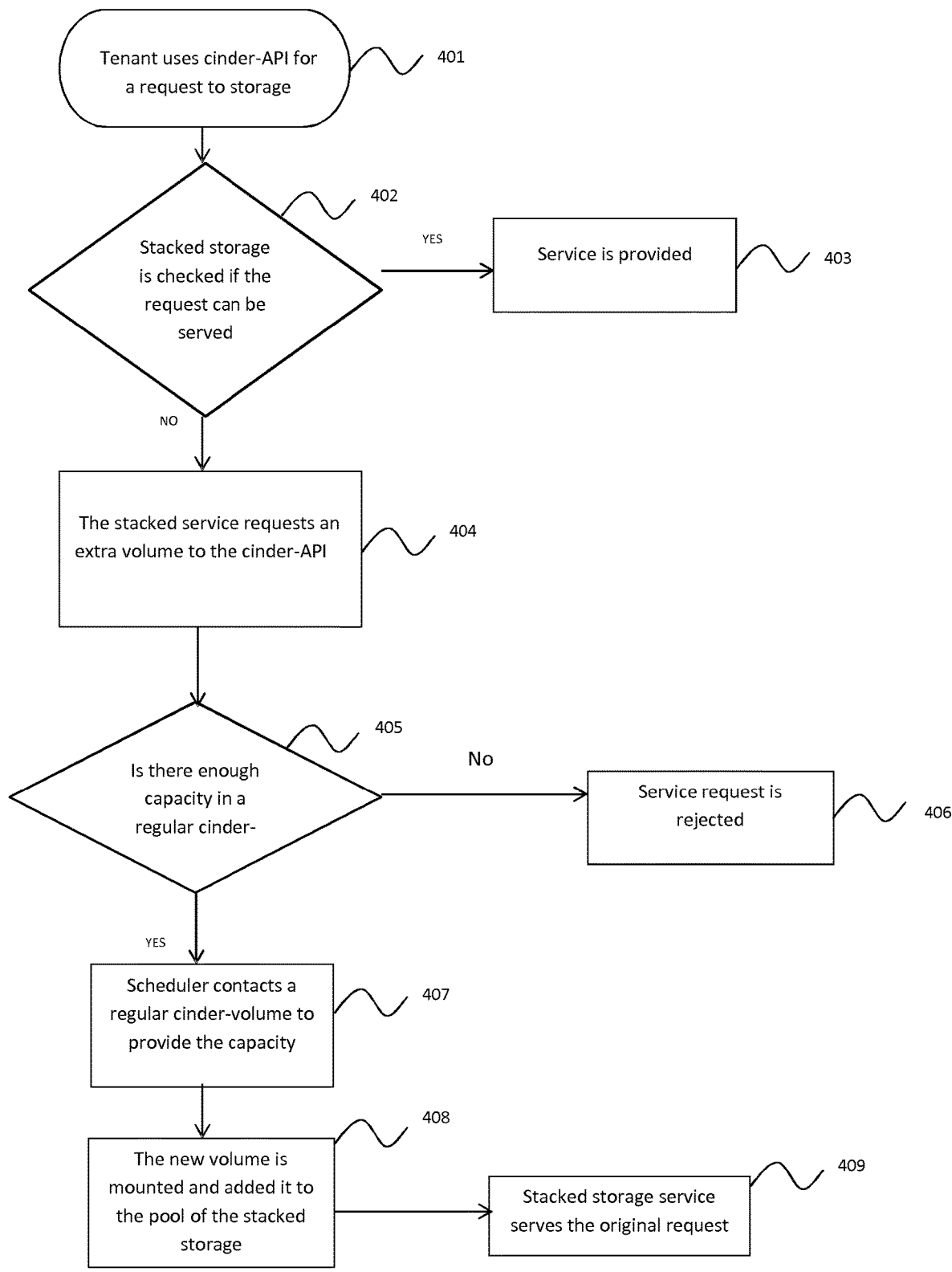
FIG. 4 shows a flowchart of a method in a control entity according to one embodiment.

In the following one embodiment of the invention is described in respect to FIG. 4 depicting a flow diagram.

In a first step 401, the tenant uses the Cinder-API to enter a request for storage service. In the next step, 402, the stacked storage is checked if the request can be served. Thus it may be that the attached storage volume as managed by the control entity is sufficient for fulfilling the request. In order to determine the availability of the storage volume, the control entity is adapted to keep track on the attached storage volume. In one preferred embodiment it may store the references to the assigned storage volume or it may ask an external database for the available storage backend.

In case enough storage volume is assigned, the service is provided, 403. For example, if the service is to create a new storage volume, then a host (e.g. Cinder volume) is contacted to provide the requested storage backend. In case of expansion, it will instruct the volume backend to expand the capacity of a specific volume Otherwise, 404 a message is sent to the Cinder-API for allocating additional storage volume. The Cinder-API uses the regular way by contacting a Cinder-scheduler for checking the available storage volume at the hosts, 405. The Cinder-scheduler has information since it is able to contact a corresponding database regarding the storage volume at the hosts so that it can decide on the provision of the additional storage volume. In case the requested storage volume is not available, the service request is rejected, 406. Otherwise the Cinder-volume at the particular host is contacted, 407. The Cinder-volume at the host upon reception of such request may either accept or reject the assignment of its storage volume. In case the Cinder-volume accepts the usage of its storage volume, an Accept message is generated which includes the references for contacting the storage volume when performing the service. The Accept message is sent to the Cinder-API which is responsible for forwarding the information about the availability of a new storage volume via the Cinder-scheduler to the control entity 408, in the sense that the new storage volume is mounted to the pool of the virtual storage volume (or stacked storage) wherein mounting means that in a database the references of the new storage volume is connected to the virtual storage volume.

The virtual storage volume (or the stacked storage) serves in step 409 the original storage service request. It may be however that the contacted host rejects the assignment of the storage volume. In this case it is proposed to contact another host. In one embodiment, the Cinder-scheduler contacts the hosts after receiving a Reject message from the Cinder-API.

In the following an embodiment of the invention is described in respect to FIG. 5.

Figure 5:
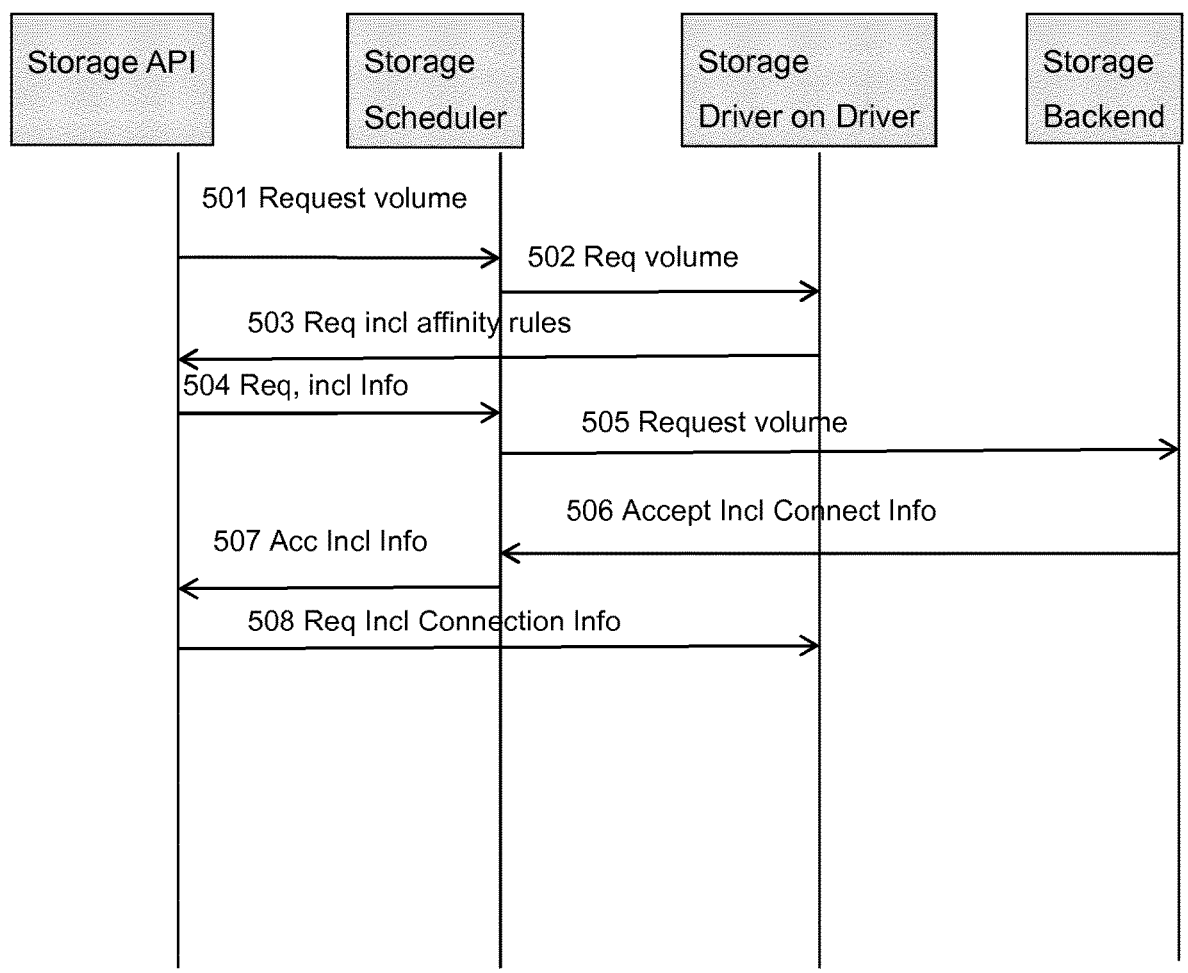
FIG. 5 shows a message exchange in a control entity according to one embodiment.

FIG. 5 depicts message exchange between a Storage API, Storage Scheduler, Storage Driver on Driver and a Storage Backend.

As first a message Request volume is sent to Storage Scheduler, 501. This message being an embodiment of the storage service request is received by a request interface. In this embodiment the request interface is represented by the Storage API and the Storage Scheduler which is placed between the Storage API and Storage Driver on Driver being an embodiment of the control entity. As next the Storage Scheduler forwards the message Request volume (a Req volume message), 502 to the Storage Driver on Driver. The Storage Drive on Drive checks the availability of the virtual storage volume. For example it is checked whether enough storage volume is available for performing the request, in case the request is to replicate the storage volume. Based on FIG. 5, when checking the available storage volume, it is also checked that any affinity or anti-affinity rule is not broken. This will prevent for example that a storage volume is replicated at the same host.

In case the Storage Driver on Driver can not fulfil the service storage request, the Storage Driver on Driver sends a Request including affinity rules to the Storage API, 503. Upon reception of the request, the Storage API generates a new request comprising the necessary information, like the volume of the additionally needed storage volume and eventual affinity/anti-affinity rules. The new generated request is sent, 504 from the Storage API to the Storage Scheduler which is responsible for requesting the additional storage directly from the host hosting a storage backend and fulfilling the requirements regarding the volume and the affinity/anti-affinity rules, 505. In case the host with the hosted storage backend accepts the usage of its storage volume, Accept message is sent back to the Storage Scheduler, 506. Said Accept message includes Connect Information, in particular the addresses or references of the storage volume needed for accessing the storage. The Accept message is forwarded to the Storage API, 507, which generates based on the received information a Request message, 508 including the relevant information, like the Connection information in order to inform the Storage Driver on Driver to assign the additional storage backend to the virtual storage volume. The step of assigning comprises storing the references (or connection information) and setting said information in relation to the virtual storage volume.

Figure 6:
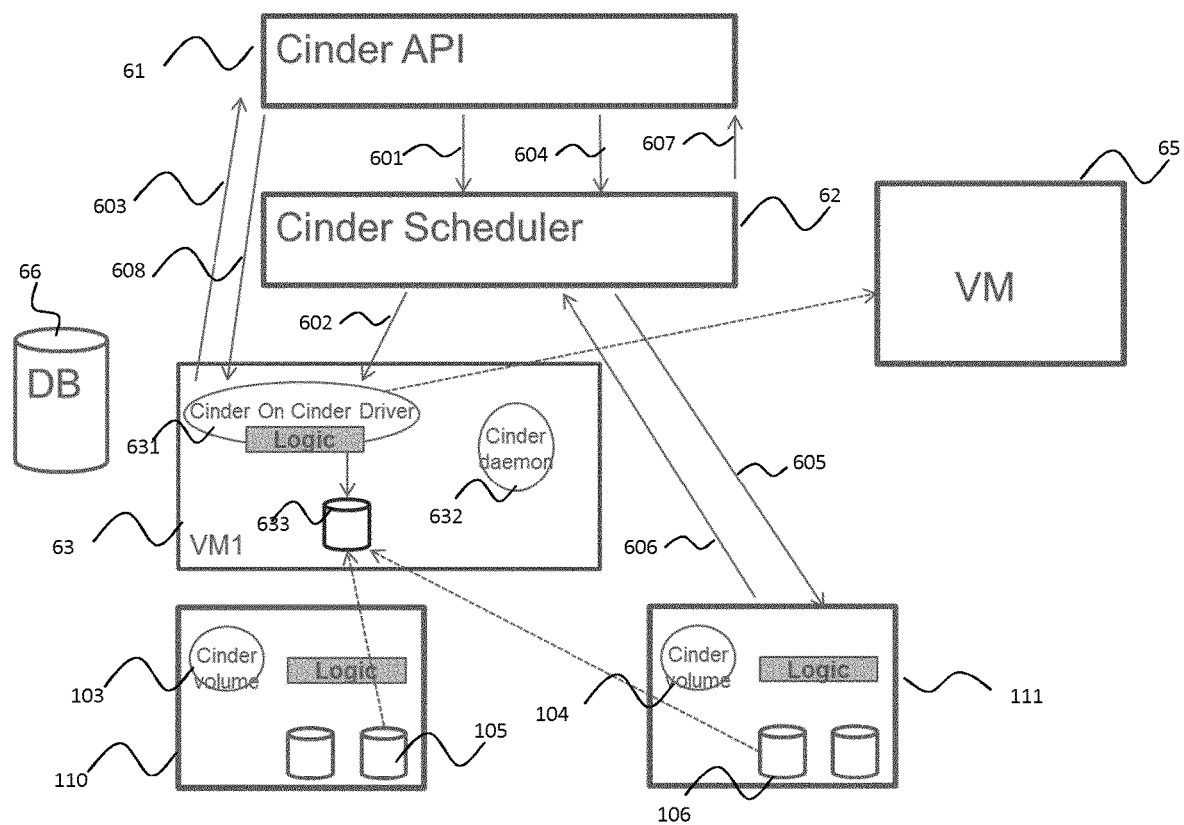
FIG. 6 shows an embodiment of Cinder architecture according to one embodiment.

In the following the invention is presented in respect to FIG. 6 showing an embodiment of cloud architecture.

Similar to FIG. 1, the architecture comprises Cinder API, 61, Cinder Scheduler 62, two hosts, 110, 111 with the hosted storage volumes 105, 106 being managed by the Cinder-volume 103, 104. Further a control entity 63 is depicted with its functionality called Cinder on Cinder Driver 631 being adapted to manage and provide the virtual storage volume. Further the control entity 63 comprises in this example a second entity, Cinder daemon 632, being responsible for collecting relevant information about the storage volume hosted by the hosts. Further a virtual storage volume 633 is depicted, wherein the storage backend, 105, 106 are assigned to the virtual storage volume. This is shown by the dotted lines coming from the storage backends. The boxes depicted as "logic" are entities adapted to communicate between different entities. In particular they provide a functionality to translate messages between the different entities. A plug-in is an example fulfilling this kind of functionality. For example at hosts 110, 111, a "logic" connects the Cinder-volume 103, 106 with the storage backend 105, 106, in the sense that it translates Cinder instructions to the instructions that the storage backend understands. There is a number of differently implemented storage backends, like for example EMC2 VNX, EMC2 VMAX, HP 3PAR, Fujitsu Eternus8000, CEPH. In order to avoid that Cinder volume integrates all the vendor specific commands, each of these vendors provides a plug-in to the Cinder-volume for connecting said Cinder volume to the specific storage backend. A similar functionality fulfils the "logic" at the entity 63, which translates the commands from the Cinder on Cinder Driver 631 and virtual storage volume in the database 633.

In the following an embodiment of a method as implemented on the architecture according to FIG. 6 is described.

Similar to FIG. 5, as first a storage service request is sent from the Cinder API to the Cinder scheduler 601, which decides to provide the request message to the Cinder on Cinder Driver 602. Upon receipt of the storage service request, the Cinder on Cinder Driver checks the available virtual storage volume 633. Here, the virtual storage volume is depicted as a database being part of the control entity 63. This should be seen as an example. In another example the available virtual storage may be provided by an external database. In this case the Cinder on Cinder Driver is adapted to contact the external database 66.

In case the virtual storage volume can not fulfil the storage service request, the Cinder on Cinder Driver sends a request 603 to the Cinder API for requesting additional storage volume. The request may further comprise requirements on the additional storage volume if the Cinder On Cinder Driver is able to determine such requirements, for example when checking of the virtual storage ends up in determining a volume which is missing to fulfil the storage service request. The Cinder API generates, upon receipt of the request message, a new request 604 comprising the necessary information, like for example the volume of the additionally needed storage volume and/or affinity/anti-affinity rules. The new generated request is sent, 605 from the Cinder API 61 to the Cinder-scheduler 62 which is responsible for requesting the additional storage directly from the host hosting a storage backend fulfilling the requirements, 605. In one embodiment it is proposed that the scheduler determines an appropriate storage backend, for example by contacting a database 66 administrating information about the capabilities and availability of the storage backend. In case the host with the hosted storage backend 106 accepts the usage of its storage volume, an accepting message 606 is sent back to the Storage scheduler 62. Said accepting message 606 includes connection information, in particular the addresses or references of the storage volume, needed for accessing the storage volume 106. The accept message 606 is forwarded 607 to the Cinder API 61, which generates based on the received information a new request message, 608 including the relevant information, like the references of the storage backend in order to inform the Cinder on Cinder Driver 63 to assign the additional storage backend to the virtual storage volume. As a result the additional storage volume is assigned to the virtual storage volume 633 for example by adding the storage volume with its parameter to the database of the virtual storage volume 633 or to the external database 66. Further the Cinder daemon 632 which may be provided as a separate entity or may be part of the control entity 63 is responsible for collecting information required for managing the virtual storage volume. The collecting may be performed by polling the hosts, in particular the Cinder-volume. The received information regarding the usage of the storage backend or exiting spare capacity on the Cinder-volume drivers may be stored in any appropriate place. In one example it is proposed that the hosts which send anyhow regular information to the scheduler are eavesdropped by the daemon in order to filter out information regarding any updates in usage of the storage backend. Also in this example the daemon may use a database like the database 66 to store the collected information, like for example information when a storage backend is used, or free again. In a further embodiment a direct interface may be provided between the control entity for contacting the hosts and for receiving answers from the hosts.

The provision of the information regarding usage of the backend storage allows that the daemon keeps track of the usage of the storage volumes created by the Cinder-on-Cinder driver 631. In case a storage volume is not used anymore by any tenant 65, it is proposed that the daemon 632 requests the Cinder-on-Cinder driver 631 to remove that storage volume from the virtual storage volume 633 so that the capacity is returned to the Cinder volume driver 103, 106. That means the Cinder volume 103, 106 is informed that its capacity is not assigned to the virtual storage volume 633. Consequently, that means that the storage volume may be used for example by another control entity. This mechanism avoids further that the regular Cinder-volume run out of capacity while the Cinder-on-Cinder drivers have plenty of unutilized capacity.

Further it is proposed the Cinder-on-Cinder Driver may use the information regarding the usage of the storage backend when estimating whether a request to the request interface for requesting additional storage volume is to be sent. In one embodiment it is proposed that in case no additional storage volume is available, the Cinder-on-Cinder Driver causes sending a Reject message to the Cinder-Api.

When implementing stacked storage services, recursively stacked configurations is to be avoided. As already mentioned the control unit, like the Cinder-on-Cinder administrates the storage backend of the hosts. Further it is the responsibility of the control entity to announce its virtual storage volume to the request interface, in particular to the scheduler, so that when receiving a storage service request the virtual storage volume is known as being available for fulfilling the request.

However in one embodiment it is proposed that the host being mounted to the virtual storage volume may be a logical storage, which may be a virtual machine or another control unit providing virtual storage volume, like for example another Cinder-on-Cinder. This may lead to inappropriate behavior as explained in the following. For the Cinder-on-Cinder the storage volumes are at first just storage backend. For example, if there are 10 physical Cinder volumes with 1 TB each, the Cinder-on-Cinder will announce 10 TB. However, if a further Cinder-on-Cinder is mounted it is to be ensured that the virtual storage volume of the other Cinder-on-Cinder is taken into account when announcing. According to the example, the first Cinder-on-Cinder sees 10 Cinder-volumes of 1 TB each and then in case another Cinder-on-Cinder providing 10 TB is attached, a storage volume of 10 TB. As a result it will offer 20 TB. This however could be again mounted as a further Cinder-on-Cinder. Thus, in the next iteration 10 Cinder-volumes of 1 TB and one virtual Cinder-volume of 20 TB will be offered. As a result 30 TB will be offered. After a while, the other one will offer 40 TB, and so on, which leads to inappropriate behavior since virtual storage volume is offered without considering the currently existing physically available storage volume.

Therefore there is a need to avoid this recursively stacked configuration. For this it is proposed to specify a virtual storage volume tag, like for example a Cinder-on-Cinder tag for distinguishing between virtual storage volume respectively storage backend that are stacked. A Cinder-on-Cinder driver will in this case check that it only uses storage backend that do not have this tag and avoid by this means recursively usage of virtual stacked or mounted storage volume providing a loop-back prevention mechanism. By this means Cinder-volume actually belongs to a Cinder-on-Cinder is identified and therefore it is prevented from being counted.

Figure 7:
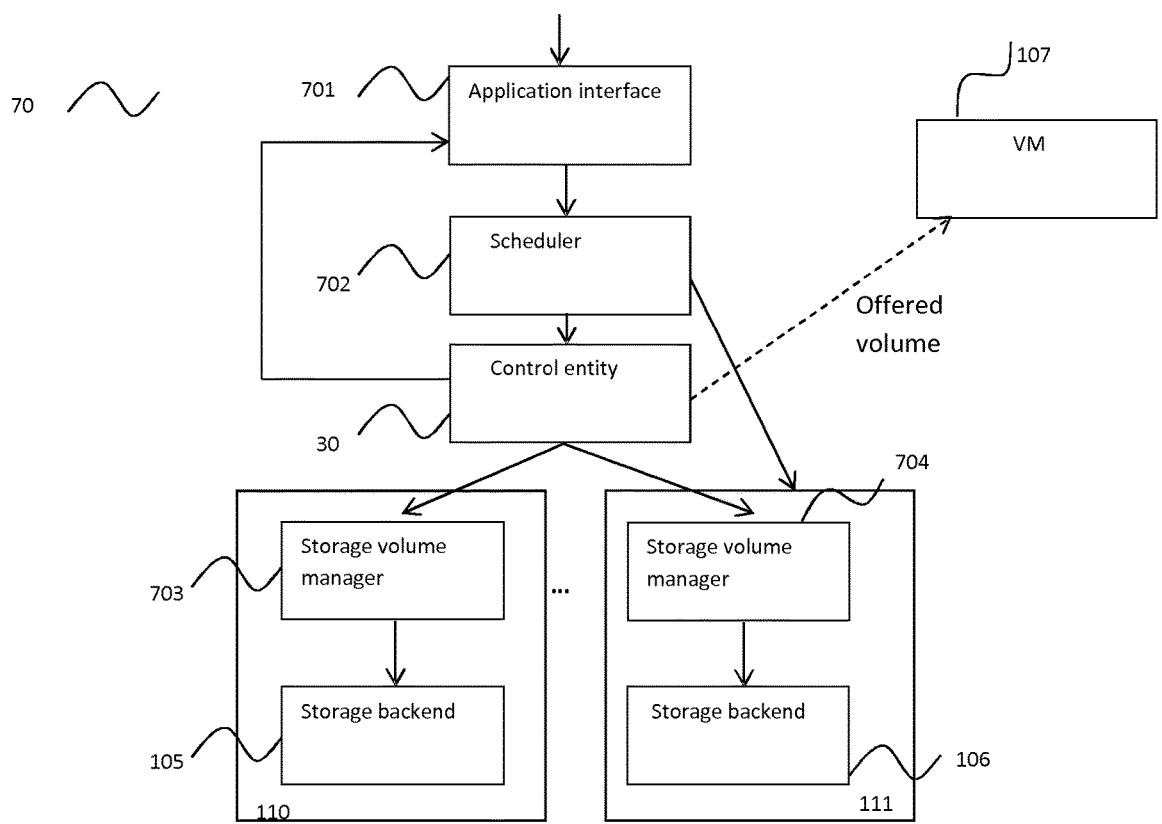
FIG. 7 shows an embodiment for cloud architecture according to one embodiment.

FIG. 7 shows a schematic view of the cloud architecture 70 with the embedded control entity 30. The control entity 30 is connected to the hosts 110, 111 with the included storage volume manager 703, 704 and the hosted storage backend 105, 106. The control entity 30 may be connected with the hosts by means of a wired or wireless network. The control entity 30 serves the virtual machine 107 by offering virtual storage volume for executing a storage service request. Optionally there is a scheduler 702 between the application interface 701 and the control entity 30.

The techniques as described herein in particular the functionality of the control node, hosts, application interface or scheduler can be implemented using code and data stored and executed on one or more computer or a computing device (e.g., an end station, a network element, server, host etc.). Such devices store and communicate (internally and/or with other electronic devices over a network) code and data using non-transitory machine-readable or computer-readable media, such as non-transitory machine-readable or computer-readable storage media. In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges.

The storage device or memory represents one or more non-transitory machine-readable or computer-readable storage media and non-transitory machine-readable or computer-readable communication media. Thus, the storage device or memory typically stores code and/or data for execution on the set of one or more processors of that electronic device. The memory may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. In particular the storage backend may be implemented as such storage device. Of course, one or more parts of an embodiment of the invention may be implemented using different combinations of software, firmware, and/or hardware.

Figure 8:
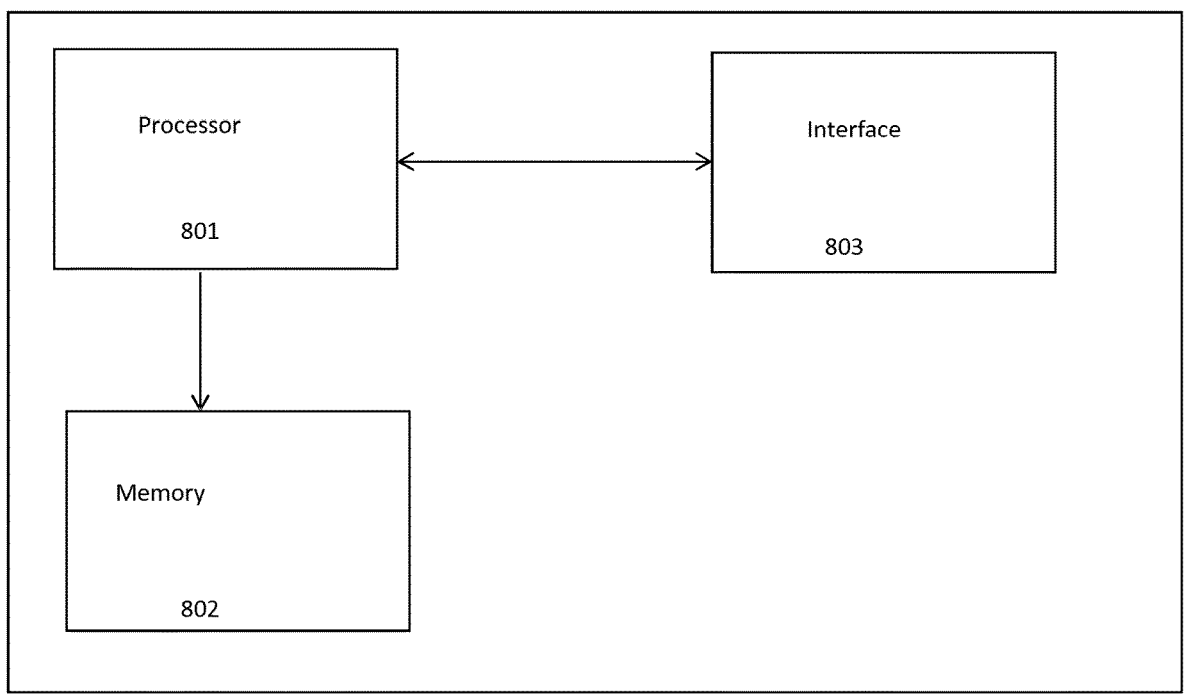
FIG. 8 shows schematically a control entity according to one embodiment.

In a further embodiment according to FIG. 8 it is proposed that an entity is a computing device with a storage device. Further the entity may comprise a memory 802 coupled to the processor(s) 801. The memory includes suitably configured program code to be executed by the processor(s) so as to implement the above-described functionalities of the control entity 30 or of the request interface entity 701. In particular, the memory may include various program code modules, which when run on the processor(s) cause performing steps as described above, e.g., corresponding to the method steps of FIG. 2 or of FIG. 9. Further the entity may comprises interface(s) 803, like a sender and a receiver unit being adapted to send and receive messages, like the described requests. Thus, the entity comprises processor(s) 801, memory 802 and interface(s) 803, which are assigned to the units as described in connection to FIG. 3 or FIG. 10 allowing execution of the program code and the functionality of the units.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Moreover, other implementations of the invention will be apparent to those skilled in the art from consideration of the specification and practice of the invention disclosed herein. It is intended that the specification and the examples be considered as exemplary only.

The invention claimed is:

1. A method for managing a virtual storage volume in a cloud architecture with at least one host providing storage volume, the method comprising:
   checking a virtual storage volume for execution of a storage service request, wherein the checking is triggered by a request interface;
   causing the request interface to request additional storage volume directly from the at least one host if the storage service request cannot be fulfilled by the virtual storage volume; and
   causing assignment of the additional storage volume to the virtual storage volume.

2. The method of claim 1, wherein the checking comprises checking whether enough storage volume is already assigned.

3. The method of claim 1, wherein the checking comprises checking affinity/anti-affinity rules of the storage volume.

4. The method of claim 1, wherein the storage service request is a request for replication of the storage volume.

5. The method of claim 1, wherein the storage service request is a request for providing file storage, a request for providing object storage, or a request for providing block storage.

6. The method of claim 1, further comprising keeping track of a usage of the assigned storage volumes by causing sending of requests to the hosts for providing information about the storage volume hosted by the hosts.

7. The method of claim 6, further comprising causing removal of an assigned storage volume from the virtual storage volume if the assigned storage volume is not used.

8. The method of claim 1, wherein the checking comprises determining requirements on the additional storage volume which is to be requested when the storage service request cannot be fulfilled by the virtual storage volume.

9. The method of claim 1, wherein the causing the request interface to request the additional storage volume comprises sending a request to the request interface for requesting additional storage.

10. The method of claim 1, wherein the causing the request interface to the request additional storage volume comprises considering information collected from the hosts regarding storage backend.

11. The method of claim 1, wherein the causing the assignment of the additional storage volume to the virtual storage volume comprises receiving a message initiated by the request interface, and wherein the message comprises references for accessing the additional storage volume.

12. The method of claim 11, wherein the causing the assignment of the additional storage volume to the virtual storage volume comprises storing, in a database, references of the storage volume in relation to the virtual storage volume.

13. The method of claim 1:
   further comprising causing a scheduler to request additional storage volume directly from at least one host;
   wherein the scheduler is contacted by an application interface; and
   wherein the scheduler and the application interface are part of the request interface.

14. The method of claim 1, further comprising announcing the virtual storage volume to the request interface.

15. A control entity adapted to manage a virtual storage volume in a cloud architecture with at least one host providing storage volume, the control entity comprising:
   processing circuitry; and
   memory containing instructions executable by the processing circuitry whereby the control entity is operative to:
      check a virtual storage volume for execution of a storage service request, wherein the checking is triggered by a request interface;
      cause the request interface to request additional storage volume directly from the at least one host if the storage service request cannot be executed by the virtual storage volume; and
      assign the additional storage volume to the virtual storage volume.

16. The control entity of claim 15, further comprising a receiver unit configured to receive the storage service request from the request interface.

17. The control entity of claim 15, wherein the instructions are such that the control entity is operative to trigger collection of information required for managing the virtual storage volume by causing sending of requests to the hosts for providing information about the storage volume hosted by the hosts.

18. The control entity of claim 15, further comprising a database configured to store virtual storage volume.

19. A request interface entity for managing a virtual storage volume in a cloud architecture with at least one host providing storage volume, the request interface entity comprising:
   processing circuitry; and
   memory containing instructions executable by the processing circuitry whereby the request interface entity is operative to:
      trigger a checking of a virtual storage volume to execute a storage service request;
      cause requesting of additional storage volume directly from the at least one host, if the outcome of the checking is that the storage service request cannot be fulfilled by the virtual storage volume; and
      cause assignment of the additional storage volume to the virtual storage volume.

20. The request interface entity of claim 19, further comprising a receiver unit configured to receive a request for additional storage volume from a control entity.

21. A system, comprising:
   a request interface entity for managing a virtual storage volume in a cloud architecture with at least one host providing storage volume, wherein the request interface entity comprises:
      first processing circuitry; and first memory containing instructions executable by the first processing circuitry whereby the request interface entity is operative to:
  trigger a checking of a virtual storage volume to execute a storage service request;
  cause requesting of additional storage volume directly from the at least one host, if the outcome of the checking is that the storage service request cannot be fulfilled by the virtual storage volume; and
  cause assignment of the additional storage volume to the virtual storage volume; and
a control entity configured to manage a virtual storage volume in a cloud architecture with at least one host providing storage volume, and configured to communicate with the request interface entity, wherein the control entity comprises:
second processing circuitry; and
second memory containing instructions executable by the second processing circuitry whereby the control entity is operative to:
  check a virtual storage volume for execution of a storage service request, wherein the checking is triggered by the request interface entity;
  cause the request interface entity to request additional storage volume directly from the at least one host if the storage service request cannot be executed by the virtual storage volume; and
  assign the additional storage volume to the virtual storage volume.

22. The system of claim 21, wherein the system further comprises a database configured to store virtual storage volume and information regarding storage volume at the hosts.

* * * * *